US012623373B2

(12) United States Patent
Del Boccio

(10) Patent No.: US 12,623,373 B2
(45) Date of Patent: May 12, 2026

(54) TARGETED CERAMIC CASTING CORE INHOMOGENEITY

(71) Applicant: RTX Corporation, Farmington, CT (US)

(72) Inventor: Anthony J. Del Boccio, Charlottesville, VA (US)

(73) Assignee: RTX Corporation, Farmington, CT (US)

( * ) Notice: Subject to any disclaimer, the term of this patent is extended or adjusted under 35 U.S.C. 154(b) by 153 days.

(21) Appl. No.: 18/132,212

(22) Filed: Apr. 7, 2023

(65) Prior Publication Data

US 2024/0335977 A1 Oct. 10, 2024

(51) Int. Cl.

| | |
|---|---|
| ***B28B 1/087*** | (2006.01) |
| ***B28B 1/52*** | (2006.01) |
| ***B28B 7/34*** | (2006.01) |
| ***B28B 21/86*** | (2006.01) |
| ***F01D 5/18*** | (2006.01) |

(52) U.S. Cl.

CPC .............. *B28B 1/087* (2013.01); *B28B 1/525* (2013.01); *B28B 7/346* (2013.01); *B28B 21/86* (2013.01); *F01D 5/187* (2013.01); *F05D 2230/21* (2013.01)

(58) Field of Classification Search

CPC ......... B22C 9/10; B28B 1/087; B28B 1/0873; B28B 1/24; B28B 1/52; B28B 1/525; B28B 17/0081; B28B 21/86; B28B 7/168; B28B 7/34; B28B 7/346; B28B 7/364; C04B 35/14; C04B 35/16; C04B 35/481; C04B 35/622

See application file for complete search history.

(56) References Cited

U.S. PATENT DOCUMENTS

| | | | | |
|---|---|---|---|---|
| 3,624,397 A | 11/1971 | Honeycutt et al. | | |
| 4,662,427 A * | 5/1987 | Larrecq | ................ | B22D 11/053 164/478 |
| 4,989,664 A | 2/1991 | Roth | | |
| 5,194,268 A * | 3/1993 | Bradley | ................ | C04B 35/622 425/84 |
| 5,861,445 A * | 1/1999 | Xu | ........................... | A61K 6/17 106/35 |
| 7,829,142 B2 | 11/2010 | Kool et al. | | |
| 9,387,533 B1 * | 7/2016 | Heneveld | ............. | B22D 29/001 |
| 11,939,871 B1 * | 3/2024 | Muenchow | ............. | F01D 25/24 |

(Continued)

FOREIGN PATENT DOCUMENTS

| | | |
|---|---|---|
| CN | 104525953 A | 4/2014 |
| JP | H0247026 A | 2/1990 |
| JP | 2017177198 A | 10/2017 |

OTHER PUBLICATIONS

European Search Report dated Sep. 10, 2024 for European Patent Application No. 24165336.9.

(Continued)

*Primary Examiner* — Yunju Kim

(74) *Attorney, Agent, or Firm* — Bachman & LaPointe, P.C.

(57) ABSTRACT

A method for molding a ceramic core includes introducing a slurry to a mold and vibrating the mold. The slurry has: silica-containing particles; polymer fiber; and matrix precursor. The mold has an outer tool and a liner held within the outer tool. The vibrating comprises operating a plurality of vibration transducers distributed along the mold.

19 Claims, 9 Drawing Sheets

(56) References Cited

U.S. PATENT DOCUMENTS

| | | | | |
|---|---|---|---|---|
| 2008/0174041 | A1* | 7/2008 | Firedman | B28B 7/366 425/432 |
| 2011/0189440 | A1* | 8/2011 | Appleby | B29C 33/38 523/435 |
| 2013/0338267 | A1 | 12/2013 | Appleby et al. | |
| 2016/0167115 | A1 | 6/2016 | Merrill et al. | |
| 2021/0187806 | A1* | 6/2021 | Bordoli | B29C 45/62 |
| 2022/0226893 | A1 | 7/2022 | Ozbaysal et al. | |

OTHER PUBLICATIONS

European Office Action dated Jan. 29, 2026 for European Patent Application No. 24165336.9.

* cited by examiner

TARGETED CERAMIC CASTING CORE INHOMOGENEITY

BACKGROUND

The disclosure relates to gas turbine engines. More particularly, the disclosure relates to forming ceramic casting cores for casting internal passageways in cast metallic component substrates.

Gas turbine engines (used in propulsion and power applications and broadly inclusive of turbojets, turboprops, turbofans, turboshafts, industrial gas turbines, and the like) have a number of internally-cooled components cast with internal cooling passageways. These are often cast using shells with partially embedded ceramic casting cores.

Historically, such ceramic casting cores have been molded in a metallic die although molding in elastomeric (e.g., silicone) molds is also known. Such an elastomeric mold may be used to manufacture core shapes that would not be removable from a hard die due to backlocking.

In one example of a core molding process using an elastomeric mold, the elastomeric mold forms a liner contained in a hard outer shell/tool with a port for introducing a ceramic slurry. The entire mold assembly may be placed in a vacuum chamber and vacuum drawn whereupon a slurry nozzle may mate with the port to introduce the ceramic slurry. However, even with the vacuum draw, the ceramic slurry may not always adequately fill the fine features of a core mold, which produce the desired internal cooling passages in the trailing edge of an airfoil.

SUMMARY

One aspect of the disclosure involves a method for molding a ceramic core. The method includes introducing a slurry to a mold; and vibrating the mold. The slurry comprises: silica-containing particles; polymer fiber; and matrix precursor (e.g., polymeric). The mold comprises: an outer tool; and a liner held within the outer tool. The vibrating comprises operating a plurality of vibration transducers distributed along the mold.

In a further embodiment of any of the foregoing embodiments, additionally and/or alternatively, the silica particles and silicate(s) if any are at least 95% by weight of solids in the slurry.

In a further embodiment of any of the foregoing embodiments, additionally and/or alternatively, by weight: the silica particles and silicate(s) if any are at least 95% by weight of solids in the slurry; and the polymer fiber is 0.010% to 2.0% by weight of solids in the slurry.

In a further embodiment of any of the foregoing embodiments, additionally and/or alternatively, the vibrating comprises: vibrating at one or more frequencies in a range of 1000 Hz to 25 kHz.

In a further embodiment of any of the foregoing embodiments, additionally and/or alternatively, the vibrating comprises vibrating for at least one of: or more seconds; at least 50% of the time of material introduction; and a time of at least 50% of the volume introduction.

In a further embodiment of any of the foregoing embodiments, additionally and/or alternatively, the vibrating causes at least one of: an at least 50% fiber concentration reduction in a target area relative to an introduced fiber concentration; and an at least 50% reduction in concentration of particles over 0.178 mm relative to an introduced concentration of said particles.

In a further embodiment of any of the foregoing embodiments, additionally and/or alternatively, the vibrating further comprises: vibrating, via a pneumatic vibrator, a platform supporting the mold.

A further aspect of the disclosure involves, a ceramic core molding apparatus comprising: a metallic fixture; and a polymeric liner held by the metallic fixture and forming a mold cavity. A plurality of transducers are mounted to the metallic fixture or the polymeric liner.

In a further embodiment of any of the foregoing embodiments, additionally and/or alternatively, the plurality of transducers are at least partially embedded in the polymeric liner.

In a further embodiment of any of the foregoing embodiments, additionally and/or alternatively, the metallic fixture is a two-piece shell.

In a further embodiment of any of the foregoing embodiments, additionally and/or alternatively, the transducers are piezoelectric transducers or electromagnetic transducers.

In a further embodiment of any of the foregoing embodiments, additionally and/or alternatively, the apparatus further comprises a pneumatic rotary vibrator. Optionally, such apparatus may involve a remanufacturing or reengineering from a baseline apparatus or configuration that lacked the transducers but had the pneumatic rotary vibrator.

In a further embodiment of any of the foregoing embodiments, additionally and/or alternatively: a portion of the mold defines an airfoil-forming core; and the transducers are at a plurality of different spanwise (airfoil inner end (inner diameter in the engine frame of reference) to outer end) and streamwise (leading edge to trailing edge) locations. Optionally for such airfoil-forming core there may be at least two said transducers to the pressure side of the core and at least two to said transducers to the suction side of the core adjacent the airfoil portion of the core. Optionally there may also be at least one transducer at each side of a root-end block of the core. Optionally, the transducers along the airfoil section may be oriented less spanwise and more streamwise than the transducers adjacent the root end block.

In a further embodiment of any of the foregoing embodiments, additionally and/or alternatively, a method for using the apparatus comprises: introducing a slurry to the mold cavity and vibrating the slurry with the transducers. The slurry comprises: ceramic particulate; polymeric fiber; and matrix precursor.

In a further embodiment of any of the foregoing embodiments, additionally and/or alternatively, the method further comprises vibrating the slurry with a rotary vibrator simultaneously with said vibrating the slurry with the transducers.

In a further embodiment of any of the foregoing embodiments, additionally and/or alternatively, the vibrating comprises vibrating at one or more frequencies in a range of 1000 Hz to 25 kHz.

In a further embodiment of any of the foregoing embodiments, additionally and/or alternatively, the vibrating biases the polymeric fiber and larger particles of the particulate away from a narrow region of the mold cavity relative to smaller particles of the particulate.

In a further embodiment of any of the foregoing embodiments, additionally and/or alternatively, the vibrating comprises vibrating at one or more frequencies in a range of 1000 Hz to 25 kHz.

In a further embodiment of any of the foregoing embodiments, additionally and/or alternatively, a method for using the apparatus. A slurry is introduced to the mold cavity, the slurry comprising: ceramic particulate; polymeric fiber; and matrix precursor. The method further includes vibratorily biasing the polymeric fiber and larger particles of the ceramic particulate away from a narrow region of the mold cavity relative to smaller particles of the particulate. Optionally, the biasing causes an at least 50% reduction in concentration of polymeric fiber in the narrow region of the mold cavity and an at least 50% reduction in concentration of particles over 0.178 mm relative to an introduced concentration of said particles in the narrow region of the mold cavity In a further embodiment of any of the foregoing embodiments, additionally and/or alternatively, the method further includes vibrating a table supporting the apparatus at a lower frequency than a frequency of the vibratory biasing.

In a further embodiment of any of the foregoing embodiments, additionally and/or alternatively, the biasing comprises: operating a plurality of piezoelectric or electromagnetic transducers.

The details of one or more embodiments are set forth in the accompanying drawings and the description below. Other features, objects, and advantages will be apparent from the description and drawings, and from the claims.

BRIEF DESCRIPTION OF THE DRAWINGS

Like reference numbers and designations in the various drawings indicate like elements.

DETAILED DESCRIPTION

Figure 1:
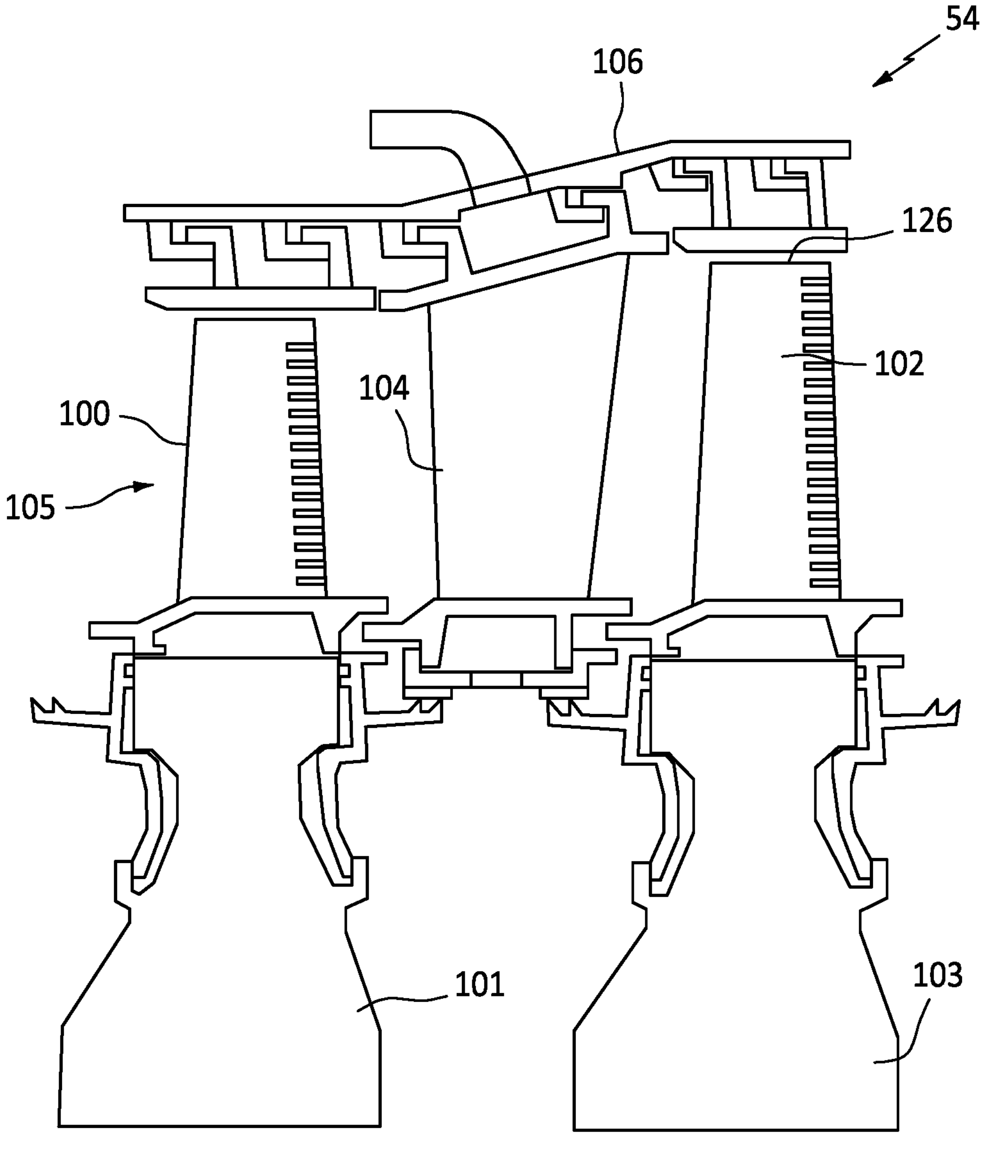
FIG. 1 is a cross-sectional view of a portion of a high pressure turbine section of a gas turbine engine.

When molding cores with very fine features, it may be undesirable to attempt compositional uniformity. For example, larger particles and/or fibers may block access of smaller particles to the fine features of the mold. This may result in undesirably large regions of matrix in those fine features. These matrix regions will then be infiltrated by cast metal thereby at least partially blocking passageways.

Key examples of such casting cores are those used to cast internal cooling passageways in turbine engine airfoil elements (blades and vanes). For example, a feedcore section may cast a plurality of spanwise passageway legs distributed generally from leading edge to trailing edge and ending in a spanwise leg that casts a discharge slot. Depending on the blade configuration, various of the legs may be configured so that flow through the legs is parallel or series (e.g., uppass/downpass/uppass). Additionally, a leading leg may be closed at spanwise ends to cast a leading edge impingement cavity fed by impingement cooling holes from the next downstream leg. Such impingement cavities can, themselves, be spanwise segmented. Due to the inherent shape of an airfoil, the trailing leg that casts a trailing edge discharge slot is subject to suffering the blockage and thus matrix inclusions noted above. When discussing such a core and its associated molding apparatus, the terms "spanwise", "streamwise", and "thickness-wise" correspond to the ultimate airfoil frame of reference.

Additionally, to cast a multi-wall airfoil, the core may include one or more skin core sections to the pressure side and/or suction side of the feedcore section effectively forming a thickness-wise stack.

Additionally, fine features of the core may be subject to finish machining. The presence of fibers in those fine features may interfere with the machining, clogging the cutting tool (e.g., abrasive ball or other element) to cause the cutting tool to damage the core. For example, fine comb-like features for casting outlet holes may be too fine to mold initially. Instead, they are molded as ridges on a plate-like section of the as-molded core. This plate-like section provides sufficient cross-sectional flow area for slurry. Prior to pattern molding, the plate-like section may be machined away, leaving an array of spaced-apart features formed by the ridges with openings in between. However, the plate-like section may still be sufficiently thin to suffer the matrix inclusions noted above. Also, similarly, molding issues may leave flash between the fine features which flash must be machined off.

The feedstock may be mixed from commercially available precursor feedstocks. The precursors may have specific narrow size distributions which are blended to form a desired distribution. The blockage considerations noted above may not be due to larger particles from the original source feedstocks. In addition to considerations of particle size distribution in feedstock, a relevant consideration is agglomeration (clumping) of precursor material to form large agglomerates that block the passageways. Such agglomeration may occur at any time from initial manufacture of the individual feedstock powders, through blending of the powders, mixing with a matrix precursor (e.g., uncured epoxy such as an A/B epoxy optionally with solvent curing inhibitor), and through to the injection process. For example, silica is relatively hydrophilic and will tend to clump during storage in ambient humidity conditions even before the different silicas are blended. Thus larger clumps (rather than larger particles from the original source feedstocks) are particularly significant in blocking fine mold passageways.

Accordingly, to permit filling and avoid excessive matrix inclusions on the one hand, and facilitate machining on the other hand, it may be desirable to provide a slurry distribution that biases fiber and larger particles away from certain fine areas such as those casting trailing edge outlets on airfoils. This distribution may be achieved via selective vibration of the core mold during and/or after slurry introduction. Additionally, the vibration may serve to break-up clumps.

In an example by weight of combined dry ingredients (the fiber, the silica, and any other particulate), the slurry has at least 85% silica or silicate (e.g., zircon ($ZrSiO_4$)) particulate with most of that being silica (e.g., at least 50% or 80% of the combined silica and silicate). The next largest amount of initial dry ingredients can be matrix-formers (e.g., resin flakes that either dissolve when blended with solvent or melt). More broadly, the combined silica and silicate may be at least 80% of the solids or at least 90%. Many manufacturers will use proprietary blends with very small amounts (e.g., up to 1.0% by weight) of one or more (typically powder and often oxide) additives (and typically aggregating to less than 3.0%).

The slurry also has an example up to 0.20% fiber (non-metallic, e.g., polymeric) by weight of combined dry ingredients (the fiber, the silica, and any other particulate) (e.g., fiber of nominal length 0.125 inch (3.2 mm, more broadly 1.0 to 5.0 mm or 2.0 mm to 5.0 mm) and diameter 0.001 inch (25 micrometers, more broadly 15 micrometers to 50 micrometers or 20 micrometers to 30 micrometers). More narrowly, example such fiber content is 0.010% to 0.10% by weight. Example fiber material includes polyethylene.

It may, for example, be possible to vibrate the core material during the molding so as to bias the larger particles and fibers away from the trailing edge (or other fine features) and bias the fines toward the trailing edge (or other fine features). Any bias of the intermediate particles may be non-existent or at least less toward the trailing edge than bias of the fines. Depending on conditions, the fines may be relatively non-agglomerated particles. Thus, it is possible that even of non-agglomerated particles the biasing directs smaller particles toward the trailing edge and larger particles away.

An example bias leaves the targeted area with few to none large agglomerated particles (e.g., particles over 0.178 mm and substantially reduces the content of more intermediate particles (e.g., particles from over 25 micrometers to 0.178 mm) by at least 50% relative to concentrations elsewhere such as the overall root section or one of the feed passageways or concentrations in the inlet flow.

An example bias leaves the targeted area with an at least 50% reduced content of such intermediate particles relative to the content as introduced to the mold or elsewhere (e.g., overall in the root section or one of the feed passageways), more particularly an at least 70% or at least 80% or at least 90% reduced (reduced by said 70% or 80% or 90%) content. This region may represent an entirety (average) of the discharge slot in the example. The large particles may similarly be reduced by an example at least 80% of at least 90% or at least 95%.

An example bias also leaves the targeted area with an at least 50% reduced content of fiber relative to the content as introduced into the mold or elsewhere such as in the overall root section or one of the feed passageways, more particularly an at least at least 70% or at least 80% or at least 90% reduced (reduced by said 70% or 80% or 90%) content. This region may represent an entirety (average) of the discharge slot in the example.

By way of background and with reference to FIG. 1, a gas turbine engine has a turbine section 54 (e.g., a high pressure turbine in a two-spool engine). The turbine section 54 may include multiple blades 105 including multiple rows, or stages, of blades including a first blade 100 and a second blade 102, along with rows, or stages, of vanes located therebetween including a vane 104. The blades 100, 102 may be coupled to disks 101, 103 respectively which facilitate rotation of the blades 100, 102 about the axis/centerline of the engine. The vane 104 may be coupled to a case 106 and may remain stationary relative to the axis.

The blade 102 may include an inner diameter edge/end 108 (e.g., of a root 144 in FIG. 2) and an outer diameter edge 110 (e.g., a tip). Due to relatively high temperatures within the high pressure turbine section 54, it may be desirable for the blade 102 (and the vane 104) to receive a flow of cooling air. In that regard, the blade 102 may receive a cooling airflow from root inlet ports. The blade 102 may define cavities that transport the cooling airflow through the blade 102.

Cooling passages and their casting methods are described with reference to the blade 102. However, one skilled in the art will realize that the cooling passage design implemented in the blade 102 may likewise be implemented in the vane 104, or any airfoil (including a rotating blade or stationary vane) in other portions of the engine or in other cooled components.

Figure 2:
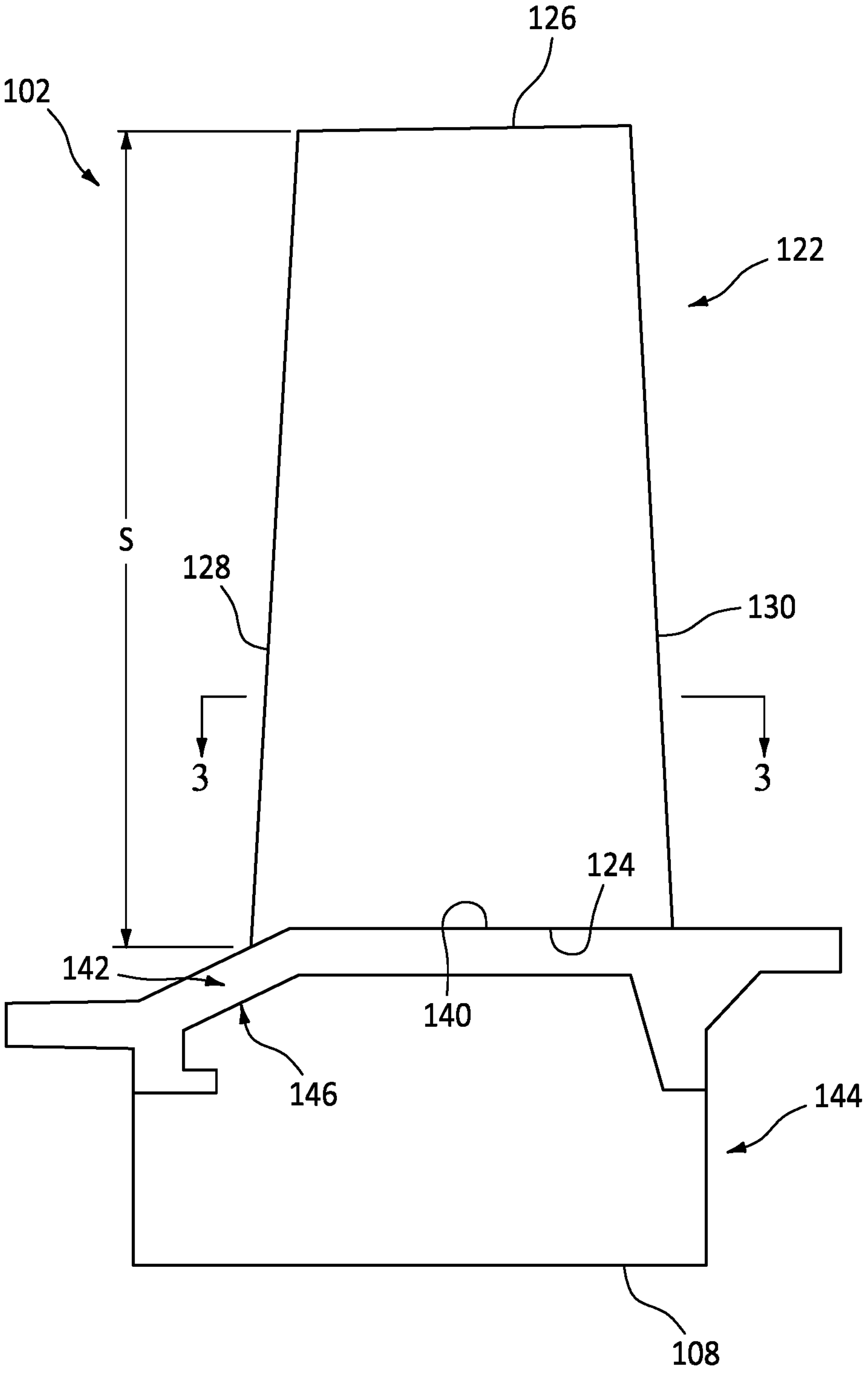
FIG. 2 is a schematic side view of a turbine blade for the high pressure turbine section of FIG. 1.

Turning now to FIG. 2, an engine turbine element 102 is illustrated as a blade (e.g., a high pressure turbine (HPT) blade) having an airfoil 122 which extends between an inboard end 124, and an opposing outboard end 126 (e.g., at a free tip), a spanwise distance or span S therebetween extending substantially in the engine radial direction. The airfoil also includes a leading edge 128 and an opposing trailing edge 130. A pressure side 132 (FIG. 3) and an opposing suction side 134 extend between the leading edge 128 and trailing edge 130.

The airfoil inboard end is disposed at the outboard surface 140 (FIG. 2) of a platform 142. An attachment root 144 (e.g., firtree) extends radially inward from the underside 146 of the platform.

The example turbine blade is cast of a high temperature nickel-based superalloy, such as a Ni-based single crystal (SX) superalloy (e.g., cast and machined). As discussed further below, an example of a manufacturing process is an investment casting process wherein the alloy is cast over a shelled casting core assembly (e.g., molded ceramic casting cores optionally with refractory metal core (RMC) components). Example ceramics include alumina and silica. The cores may be fired post-molding/pre-assembly. An example investment casting process is a lost wax process wherein the core assembly is overmolded with wax in a wax die to form a pattern for the blade. The pattern is in turn shelled (e.g., with a ceramic stucco). The shelled pattern (not shown) is dewaxed and hardened (e.g., a steam autoclave dewax followed by kiln hardening or a kiln hardening that also vaporizes or volatilizes the wax). Thereafter, open space in the resulting shell casts the alloy.

The blade may also have a thermal barrier coating (TBC) system (not shown) along at least a portion of the airfoil. An example coating covers the airfoil pressure and suction side surfaces and the gaspath-facing surfaced of the platform. An example coating comprises a metallic bondcoat and one or more layers of ceramic (e.g., a YSZ and/or GSZ).

Figure 3:
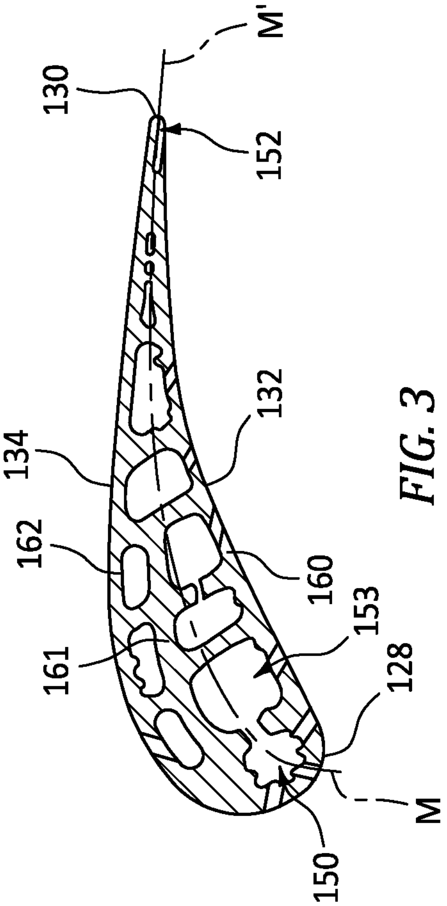
FIG. 3 is a transverse (generally tangential to the engine centerline) sectional view of an airfoil of the turbine blade of FIG. 2.

FIG. 3 also shows a camber or mean line (M-M') extends from the leading edge to the trailing edge. All locations on the mean line (M-M') are equidistant from the sides (in a perpendicular direction to the mean line at the location). For purposes of this disclosure, elements, regions, or portions thereof that are below the mean line (M-M') in FIG. 3 are considered to be on the pressure side, and elements, regions, or portions thereof that are above the mean line (M-M') in FIG. 3 are considered to be on the suction side (e.g. a suction side connector arm or a suction side wall discussed below).

Three-dimensionally, the camber line is a mathematical surface formed by the camber lines along all the sequential sections. The blade has a cooling passageway system with a plurality of spanwise passageways (passageway legs/segments/sections) within the airfoil. These legs include a series of passageways extending from a leading passageway 150 at the leading edge to a trailing edge discharge slot 152. The leading passageway 150 may be an impingement cavity fed by the second passageway 153 downstream/aft. The example airfoil is a so-called multi-wall airfoil with multiple (two shown) groups of passageways spaced apart between the pressure side and the suction side to leave a pressure side wall 160, a suction side wall 162, and an intermediate wall 161. In addition to the discharge slot, the various passageways may have outlets (e.g. film cooling outlets to the pressure side or suction side).

Figure 4:
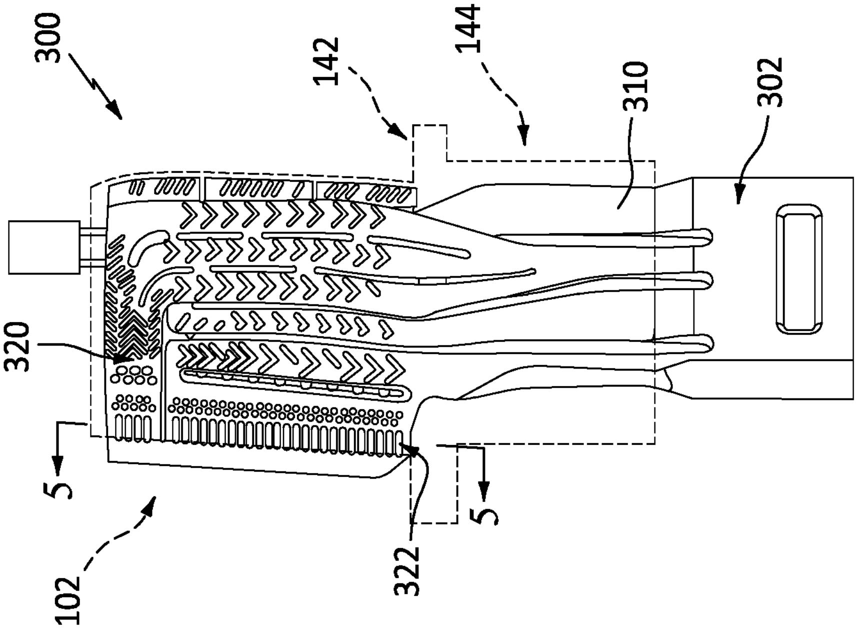
FIG. 4 is a first view of a casting core.

FIG. 4 shows a ceramic casting core 300 with a broken line schematic showing of the blade 102. The core 300 has a block section 302 that serves to structurally link a plurality of sections that in turn form the as-cast blade internal passageways. These sections include a plurality of trunk sections 310 that cast trunks through the root extending from corresponding inlets in the root inner diameter end/surface. Depending on implementation, the trunks may branch to some degree so that a given blade trunk feeds more than one spanwise passageways. Additionally, one spanwise passageway may feed another such as via a turn in an up-pass/down-pass configuration or via a spanwise array of holes formed by spanwise tie portions of the core linking two spanwise sections. FIG. 3 shows several examples of such connections.

In addition to branching, there can be merging. FIG. 4 shows several spanwise core sections merging to a tip flag section 320 such that the corresponding spanwise passageways feed the tip flag passageway FIG. 4 also shows a trailing edge discharge slot section 322 of the core having an outer diameter section as the aft/downstream end of the tip flag and a larger inner diameter section extending aft from a trailing spanwise passageway section that in turn extends outward from the trailing one of the trunk sections.

Figure 5:
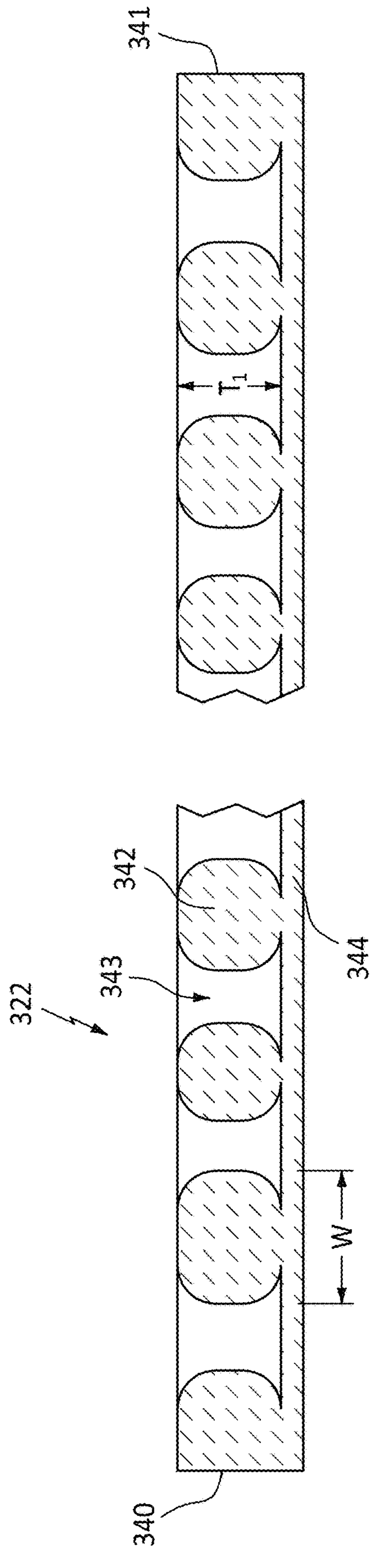
FIG. 5 is a sectional view of the core of FIG. 4.

FIG. 5 shows the trailing edge discharge slot section 322. It extends from an inner diameter end 340 to an outer diameter end 341 and has a plurality of streamwise legs 342 separated by holes or recesses 343. Theoretically, the core may be molded with through holes 343. However, molding issues (discussed below) may cause a flash layer 344 to link the legs. The flash layer may need to be ground away post-molding so that the through holes 343 can cast walls or posts joining the pressure side wall to the suction side wall.

The legs 342 are relatively fine. FIG. 5 shows a width $W_1$ (e.g., 0.030 inch to 0.040 inch (0.76 mm to 1.0 mm, more broadly 0.50 mm to 2.0 mm) and a height $T_1$ of 0.010 inch to 0.020 inch (0.25 mm to 0.51 mm, more broadly 0.20 mm to 0.80 mm or 0.15 mm to 1.0 mm). As noted above, it is desirable to direct the solids that flow into the corresponding mold sections for the legs 342 to be relatively rich in small ceramic particles and lean in fiber and larger ceramic particles.

Figure 6:
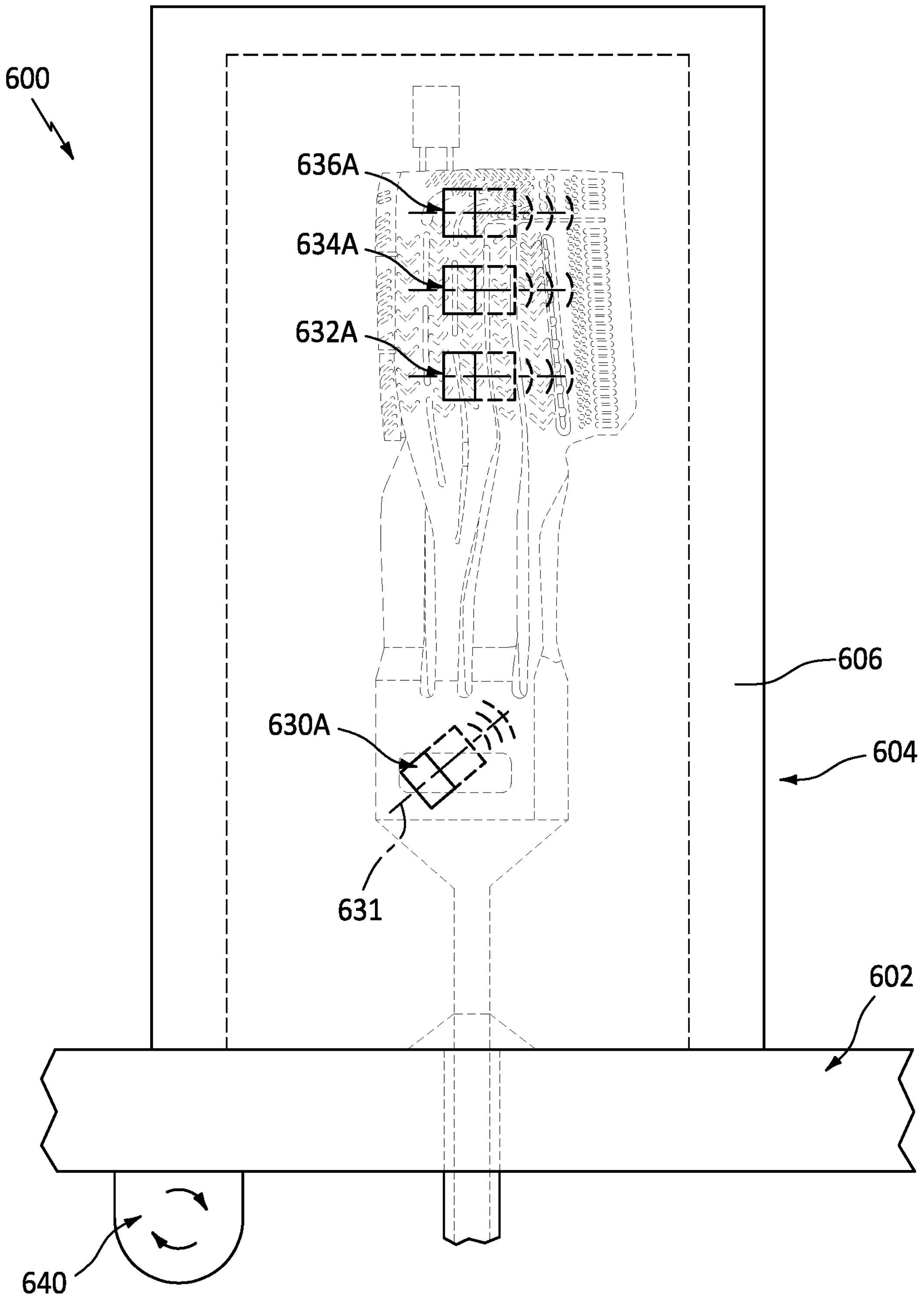
FIG. 6 is a partially schematic first view of a mold apparatus for forming the core of FIG. 4.
Figure 7:
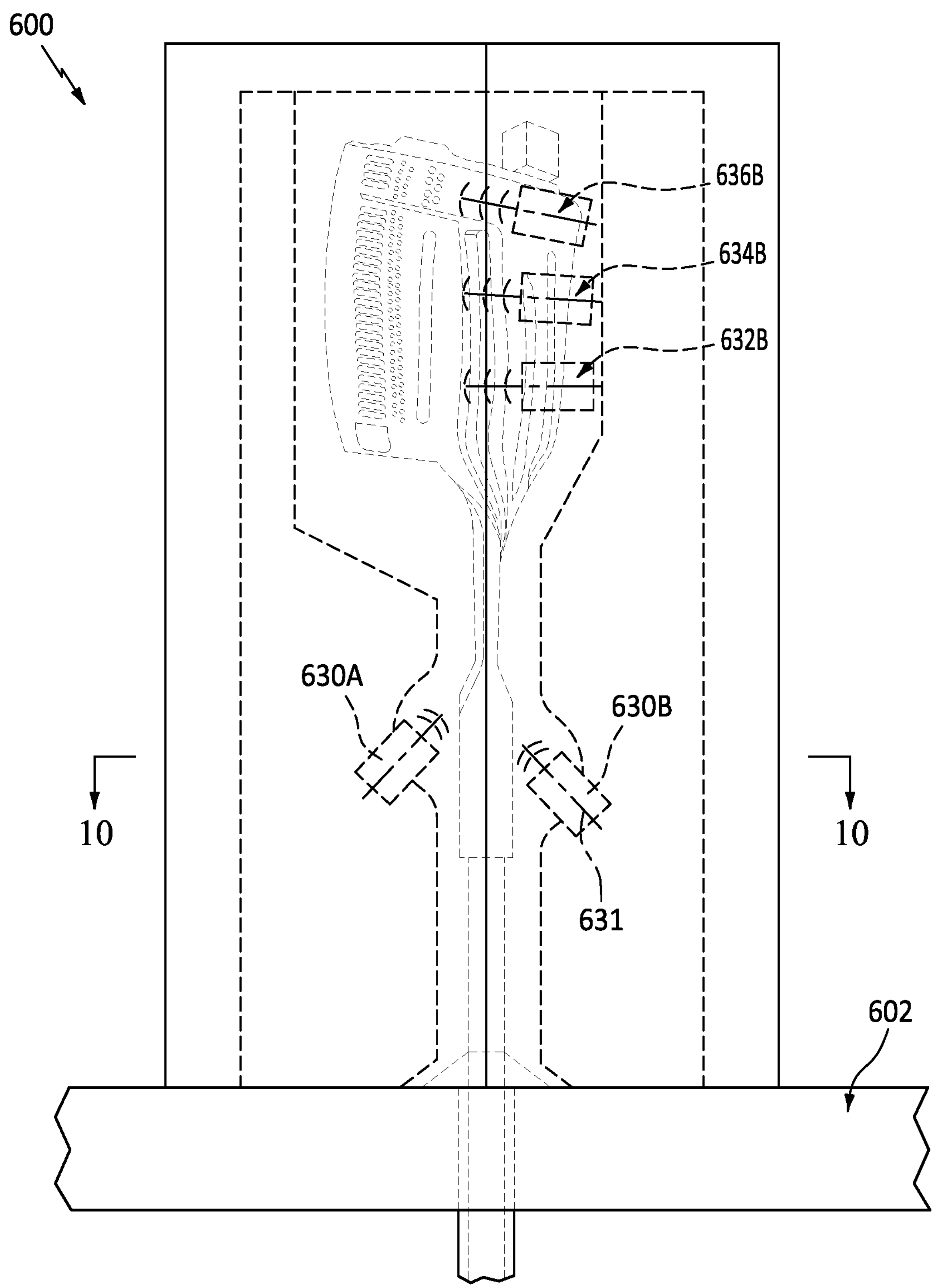
FIG. 7 is a partially schematic second view of the mold apparatus of FIG. 4.
Figure 8:
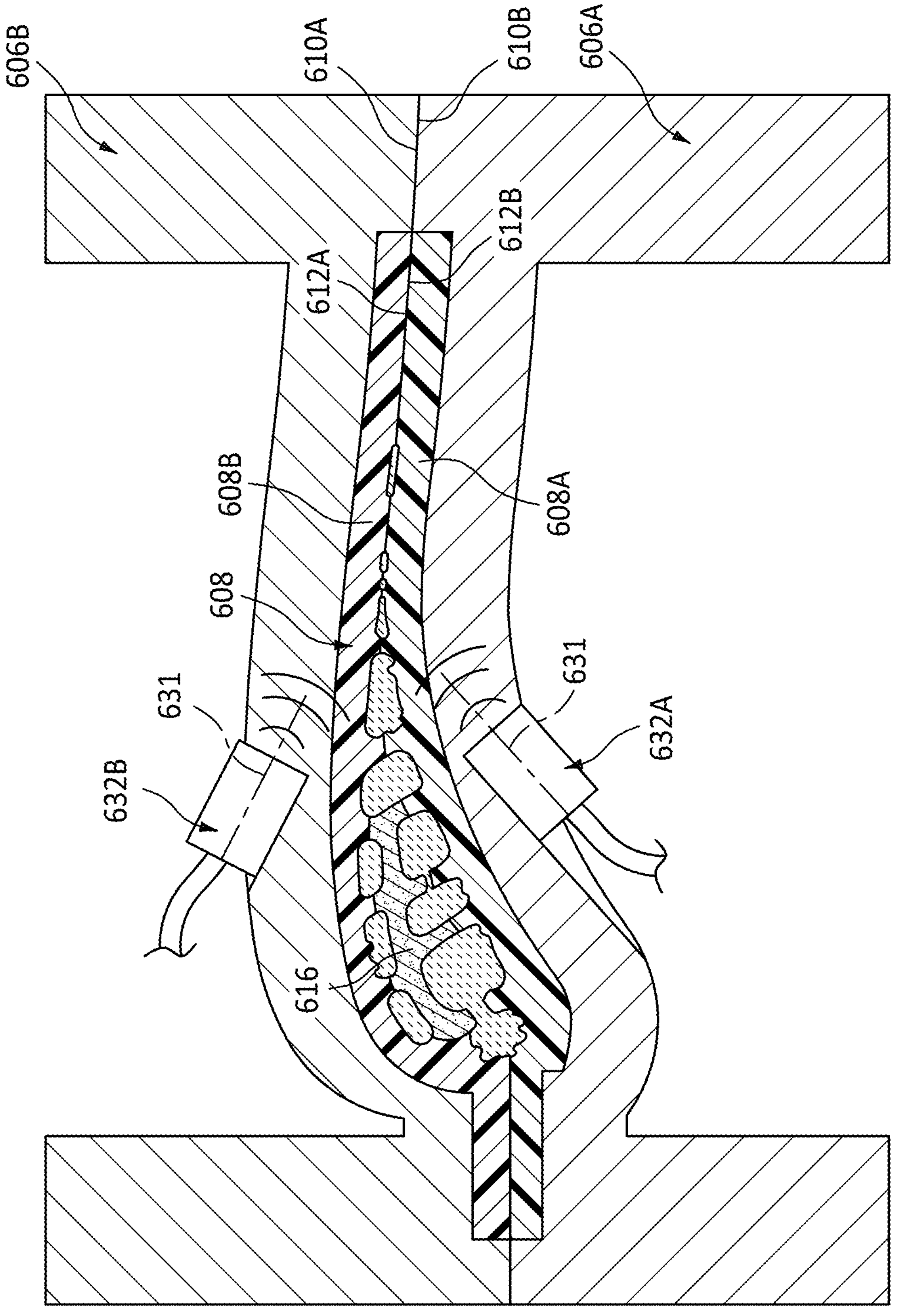
FIGS. 8, 9, and 10 are partially schematic sectional views of the mold apparatus.
Figure 9:
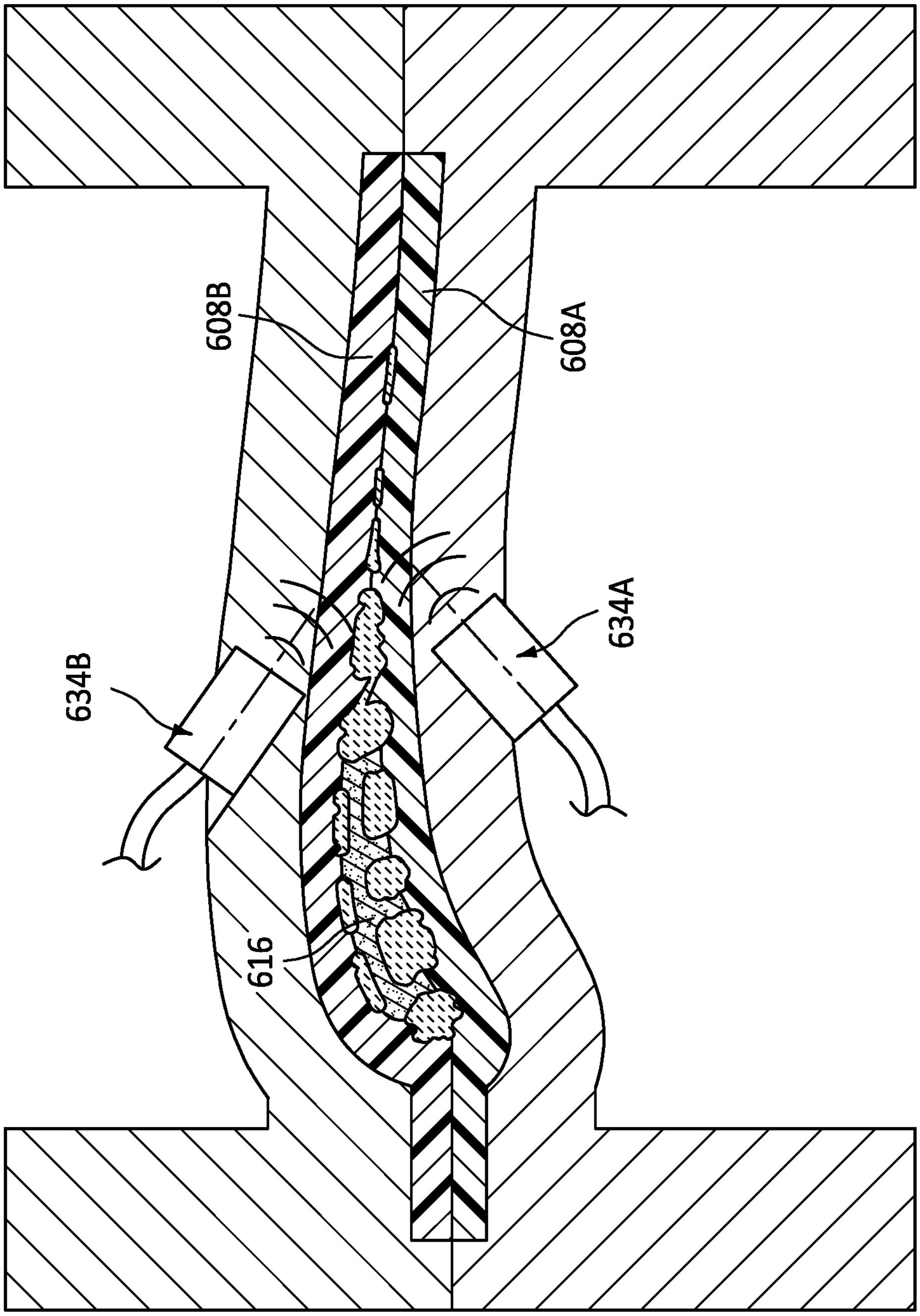

FIG. 6 shows a casting apparatus 600 having vibration transducers distributed around the core-molding cavity as discussed further. The apparatus 600 has a platform or table 602 (injection table) supporting a core mold assembly 604. As noted above, an example core mold assembly 604 comprises a hard fixture/tool/shell 606 (e.g., metallic) with a soft liner 608, see FIG. 8, which may comprise an elastomeric material such as silicone).

In addition to the example liner having two flexible elastomeric layers, optionally, there may be one or more sacrificial inserts 616. Examples of sacrificial inserts are used to mold cores for so-called multi-wall airfoils wherein one or more generally streamwise walls are positioned between the pressure side and suction side to separate two or more groups of passageways. The illustrated example shows a single sacrificial insert used to mold adjacent faces of two groups of legs of the core. For a further example (not illustrated) two such inserts could be stacked to mold a core having three groups of legs (a pressure side group, a suction side group, and an intermediate group). Example insert material is wax. Alternative core material may be hard plastics or elastomers. Depending on implementation, the insert may remain with the core through wax pattern overmolding, in which case the insert may become a part of the wax pattern. Alternatively, the insert may be lost (e.g., melted or decomposed) during a core hardening step (e.g., firing) prior to wax pattern overmolding.

FIGS. 6-10 are schematic and have flattened or otherwise deformed perspective for purposes of illustration. Twist in the blade airfoil relative to the root means that transducers having a given geometric relationship to the pressure side or suction side of the root may be oriented differently in an absolute reference frame to transducers having similar relation to the pressure side or suction side of the airfoil.

Figure 10:
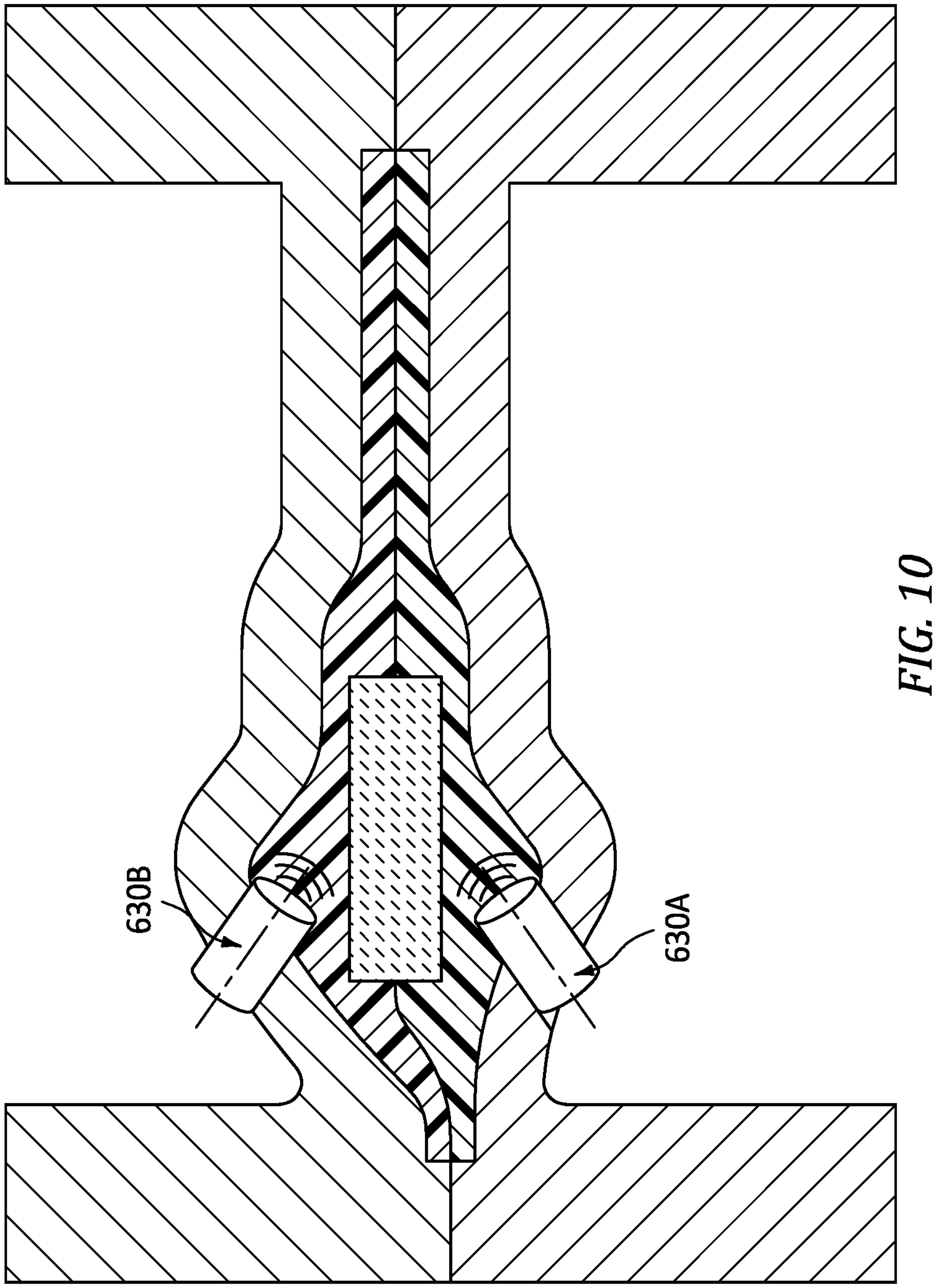

In one group of sub-examples, one or more of the transducers are mounted directly to (e.g., including embedding within) the liner pieces (see 630A and 630B in FIG. 10). Such embedding may be achieved by molding the liner pieces partially over the transducers (e.g., held within a liner molding die, not shown). In another group of sub-examples (e.g., shown for the transducers 632A-C and 634A-C), the transducers are embedded directly only to the tool 606 without being embedded in the liner 608. For example, they may be in machined pockets in the tool (e.g. closed-ended compartments).

The transducers are schematically shown as right circular cylinders having central longitudinal axes 331 (transducer frame of reference), which correspond to a vibration direction. The transducers are schematically shown in simple cylindrical (e.g., right circular cylindrical) compartments in or through the hard tool and/or liner. Further variations may be contemplated. These may include various additional mounting features. For example, a portion of a compartment may be internally threaded to mate with a transducer having an externally threaded housing or the compartments may be closable such as via a threaded cap or plug that may hold the transducer in place.

Example transducers are electrical (e.g., piezoelectric or electromagnetic coil driven (e.g., rod and coil type such as used in acoustic tone generators)).

The example hard fixture may have two main pieces 606A, 606B (e.g., machined from billet or additively manufactured with optional finish machining) that may be assembled to each other and then disassembled to release the liner for subsequent release of the molded ceramic core from the liner. When casting a core for an airfoil element such as a blade, one of the fixture pieces may fall generally to the pressure side and the other generally to the suction side of the ultimate airfoil frame of reference.

Similarly, the liner 608 may have two (or more) pieces (e.g., molded) 608A, 608B with one piece lining each of the fixture pieces and preassembled to that associated fixture piece prior to mating the fixture pieces to each other. The fixture halves have mating surfaces 610A, 610B and the liner halves have mating surfaces 612A, 612B. Depending on molding techniques, alternative liners may have more pieces stacked. And intermediate liner pieces may be rigid plastic or the like. The fixture pieces form a compartment for accommodating the liner when assembled. The liner pieces form compartments/passageways complementary to and for forming the as-molded core (e.g., before cutting away gating (at the block section 302 inner diameter end) and the like to form the FIG. 4 core.

In one group of examples, vibration transducers 630A and 630B are positioned on opposite sides of the portion of the cavity that molds the block. Also, they are partially embedded in the liner, on the pressure and suction side respectively of the block portion. The example transducers are oriented partially parallel to a flow direction of the slurry into the mold. A range of examples may be between parallel to the flow and 90° off-parallel. As the flow direction is essentially radially outward adjacent the transducers 630A and 630B, axes 331 of the transducers may be oriented partially radially outward (e.g., within 60° or 45° or 40° of radially outward with the upper end of that transducer axis within the transducer being closer to the mold cavity.

There also may be a partial rearward orientation to the transducers 630A and 630B to help with the biasing of fines toward the trailing edge. Thus, the transducers may start an initial segregation biasing the fines aftward even before there is a flow split. This may help bias fines to the trailing trunks for subsequently passing to the discharge slot portion of the core.

Adjacent the airfoil portion of the core on the pressure and suction side respectively, there are a spanwise array of streamwise-pointing transducers 632A, 632B, 634A, 634B, 636A, and 636B. These are also oriented relatively parallel to the mold. The (radially) outboard pair 636A/B are positioned and oriented adjacent the tip flag section of the mold to bias particle distribution in the tip flag.

The inboard two pairs 632A/B and 634A/B are principally positioned and oriented to affect flow from the trailing leg through the discharge slot section. Thus, the transducers along the airfoil section may be largely oriented aimed toward the trailing edge (e.g., within 30° or 20° viewed from the side and within 50° or 40° viewed radially).

Thus, in an example modification of a baseline process and associated apparatus, the vibration transducers may be added transducers in addition to the baseline vibration source 640 (e.g., rotary pneumatic as noted above). Also, the number of added transducers may be substantial (e.g., at least five or an example five to twenty). For example, in a context of an airfoil, the added transducers may be distributed both around the airfoil cross-section (streamwise adjacent pressure and/or suction sides) and distributed spanwise. Multiple streamwise distributed transducers at or near a given spanwise location may be needed to achieve a desired distribution. Thus, there may be an example at least two transducers adjacent each side of the airfoil. Or the at least two may only be along the pressure side or suction side. When present, there may be two transducers (at least one on each side) adjacent the block to the inner diameter and of the root (such as shown) or adjacent the trunks in the root section.

The fixture may be clamped to the injection table. A vacuum is created within the fixture (by a vacuum pump, not shown) while slurry is pumped into the entrance of the fixture. The rotary vibrator 640 provides agitation to the fixture during injection. To vent the mold cavity, the liner may have small ports (not shown) and the fixture may not be fully sealed. Particularly with a lack of such sealing near the trailing edge, pressure difference may force slurry between mating liner sections (due to their deformability) to form the trailing edge flash 344.

The example platform has a port 650 for introducing the slurry. A slurry flowpath proceeds downstream from the port into the mold and branches through various core cavity spaces. In the example, the port is inboard of a core section that will form blade root trunks so the slurry flowpath initially passes spanwise. To aid such passing, one of the transducers 632 is close to upstream along the slurry flowpath. Two more 634 and 636 are progressively downstream. One other 638 is at the tip.

Potentially, different transducers may apply different respective frequencies simultaneously to achieve different biases for the different particles and fibers. Due to likely limited spanwise influence, such groups of transducers may be duplicated at multiple spanwise locations. Such distribution will depend on core geometry and the slurry flow path through the mold. With the trailing edge discharge slot example, the spanwise symmetry suggests a spanwise array of transducers 630A-C at generally similar positioning about the airfoil section. In this example, the oscillation direction 950 of those trailing edge transducers is close to parallel to the mean line.

The transducers work by taking advantage of the harmonic frequencies that certain sizes and densities of the particles have. A resonant frequency will have much greater movement energy than non-resonant. These transducers can be turned off and on at will to affect the slurry when more movement is needed and turned off when it is not desired.

In contrast, the baseline pneumatic vibrator 640 produces continuous, broad based vibration that does not take part geometry or slurry movement into consideration. Its sole job is to shake the whole fixture in an attempt to keep the slurry moving. The example pneumatic vibrator is an air powered rotary device that creates circular vibration in two axes. The vibration is induced into the table the fixture rests on. The frequency range is lower (typically max ~500 Hz (e.g., up to 500 Hz or an example 5 Hz to 300 Hz) than electrical transducers (typically range 1 Hz-10 MHz. However, the electrical transducers 630A/B, 632A-C, and 634A-C will be used in a range above the rotary (e.g., 500 Hz to 25 kHz, more particularly 1000 Hz to 25 kHz or 5.0 kHz to 15 kHz).

Advantageously the vibration is occurring during introduction of the slurry and not merely after the mold cavity has been filled. The binder (e.g., epoxy) may progressively cure, greatly limiting the ability to redistribute particulate size once introduced. Additionally, jamming-up of larger particles and fiber into the finer passageways may prevent any redistribution. Accordingly, advantageously, the vibrating occurs during the entirety of introduction of slurry to the mold cavity (at least the portion of such introduction once slurry has entered a portion of the cavity that forms the ultimate part (e.g., as opposed to a portion that merely forms gating)).

More broadly, the vibration time may represent at least 50% of the total time during which the slurry is introduced and a time during which at least 50% by volume or weight of the slurry is introduced (e.g., if there is a change in flow rate). This will differ from the first alternative. Additionally, the vibration may represent a duration of at least 5 seconds, more typically, at least 10 seconds or an example 5 seconds to 200 seconds with optional alternative lower limits of 10 seconds and 20 seconds and optional upper limits of 40 seconds, 50 seconds, 60 seconds, and 100 seconds. Such upper limits are not dictated by necessity but rather, as noted above, reflect diminishing return for typical molding processes. Such diminishing return means there is little benefit to vibrating during more than the entire introduction period.

Relative to the slurry introduced to the mold, the biasing vibration may reduce concentration of fiber and larger particulate in the tip flag and discharge slot regions as discussed above.

Particular frequencies and transducer positions and orientations best for breaking-up clumps may differ from those best for merely biasing distribution. Thus, the possibility exists of having only transducers serving one purpose, having only transducers serving the other purpose, having different transducers serving each purpose, or having transducers that are tuned to a compromise so as to serve both purposes. As such, it is possible that the transducers not only operate differently from each other but may have varied operation such as alternating between frequencies respectively associated with biasing and clump breaking.

In an example of engineering the distribution of the transducers and their driving method, trial and error experimentation may be used to determine the most effective angles, frequencies, and amplitudes to promote or limit slurry movement or break up clumps or reduce clumping. An initial positioning and orientation may be made aligned with the part such as show with the transducers facing parallel to direction of flow into fine passageways. Thereafter experimentation involving molding and sectioning/examining cores for particle distribution may be iterative with frequency and transducer positions being varied. Once a good arrangement for one part has been found, that may serve as a baseline for optimizing for a new part design/configuration.

In the FIG. 10 example, the transducers are seen directing vibrations in a region laterally bounded by the hard tool. In some implementations, the transducers may merely be added to an existing hard tool with little change other than machining (or otherwise forming) compartments to receive the transducers and adding any associated hardware. However, in other implementations, the shape and positioning of the metal tool (e.g., and thus the local thickness of the liner) may be tailored to focus or otherwise direct the vibrations. Depending on a situation, such modification may be via iterative experimentation or may be via computer modeling.

Among further variations are slurries that do not include polymeric fiber (e.g., still are a majority or greater number mentioned above ceramic such as silica).

The use of "first", "second", and the like in the following claims is for differentiation within the claim only and does not necessarily indicate relative or absolute importance or temporal order. Similarly, the identification in a claim of one element as "first" (or the like) does not preclude such "first" element from identifying an element that is referred to as "second" (or the like) in another claim or in the description.

One or more embodiments have been described. Nevertheless, it will be understood that various modifications may be made. For example, when applied to an existing baseline casting technology and cast article configuration, details of such baseline may influence details of particular implementations. Accordingly, other embodiments are within the scope of the following claims.

What is claimed is:

1. A method for molding a ceramic core, the method comprising:
introducing a slurry to a mold; and
vibrating the mold,
wherein:
a portion of the mold defines an airfoil-forming core;
the slurry comprises:
silica-containing particles;
polymer fiber; and
matrix precursor;
the mold comprises:
an outer tool; and
a liner held within the outer tool; and
the vibrating comprises:
operating a plurality of vibration transducers distributed along the mold, the vibration transducers mounted in pockets in the outer tool at a plurality of different spanwise and streamwise locations; and
vibrating, via a pneumatic vibrator, a platform supporting the mold.

2. The method of claim 1 wherein the slurry comprises:
the silica-containing particles and silicate(s), if any, are at least 95% of solids in the slurry.

3. The method of claim 1 wherein by weight:
the silica-containing particles are at least 95% of solids in the slurry;
the polymer fiber is 0.010% to 0.20% by weight of solids in the slurry.

4. The method of claim 1 wherein the vibrating comprises:
vibrating at one or more frequencies in a range of 1000 Hz to 25 kHz.

5. The method of claim 1 wherein the vibrating comprises vibrating for at least one of:
10 or more seconds;
at least 50% of the time of material introduction; and
a time of at least 50% of the volume introduction.

6. The method of claim 1 wherein the vibrating causes at least one of:
an at least 50% fiber concentration reduction in a target area relative to an introduced fiber concentration; and
an at least 50% reduction in concentration of particles over 0.178 mm relative to an introduced concentration of said particles.

7. The method of claim 1 wherein:
the vibration transducers are piezoelectric transducers or electromagnetic transducers.

8. The method of claim 1 wherein:
the plurality of vibration transducers are at least partially embedded in the liner.

9. The method of claim 1 wherein the vibrating:
biases the polymeric fiber and larger particles of the ceramic particulate away from a narrow region of the mold cavity relative to smaller particles of the particulate, so as to cause an at least 50% reduction in concentration of polymeric fiber in the narrow region of the mold cavity and an at least 50% reduction in concentration of particles over 0.178 mm relative to an introduced concentration of said particles in the narrow region of the mold cavity; and
the narrow region comprises legs of a discharge slot section of the ceramic core.

10. The method of claim 1 wherein the vibrating:
biases the polymeric fiber and larger particles of the ceramic particulate away from a narrow region of the mold cavity relative to smaller particles of the particulate, so as to cause an at least 50% reduction in concentration of polymeric fiber in the narrow region of the mold cavity and an at least 50% reduction in concentration of particles over 0.178 mm relative to an introduced concentration of said particles in the narrow region of the mold cavity.

11. A casting method comprising:
molding, according to claim 1, a ceramic core;
casting alloy over the ceramic core.

12. The casting method of claim 11 wherein:
the casting forms a blade having an attachment root and an airfoil.

13. The casting method of claim 5 further comprising:
firing the ceramic core.

14. A method for molding a ceramic core, the method comprising:
introducing a slurry to a mold; and
vibrating the mold,
wherein:
the slurry comprises:
silica-containing particles;
polymer fiber; and
matrix precursor;

the mold comprises:

an outer tool; and a liner held within the outer tool; and the vibrating comprises:

operating a plurality of vibration transducers distributed along the mold and partially embedded in the liner and partially embedded in the outer tool.

15. The method of claim 14 wherein:

the outer tool is a metallic two-piece shell.

16. A casting method comprising:

molding, according to claim 14, a ceramic core;

casting alloy over the ceramic core.

17. A method for casting, the method comprising:

molding a core, the molding comprising:

introducing a slurry to a mold; and vibrating the mold; and casting alloy over the core, wherein:

the slurry comprises:

silica-containing particles;

polymer fiber; and matrix precursor;

the mold comprises:

an outer tool; and a liner held within the outer tool; and the vibrating comprises:

operating a plurality of vibration transducers distributed along the mold and mounted in pockets in the outer tool.

18. The casting method of claim 17 wherein:

at least some of the pockets closed-ended compartments in the outer tool; and the casting forms a blade having an attachment root and an airfoil.

19. The casting method of claim 17 further comprising:

firing the molded core.

* * * * *